(12) United States Patent
Sato

(10) Patent No.: US 7,891,823 B2
(45) Date of Patent: Feb. 22, 2011

(54) LIGHT SOURCE DEVICE, LIGHT SOURCE UNIT AND PROJECTOR PROVIDED WITH A CONICAL REFLECTING MIRROR TO INCREASE UTILIZATION EFFICIENCY OF EMITTED LIGHT

(75) Inventor: Makoto Sato, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 656 days.

(21) Appl. No.: 11/983,381

(22) Filed: Nov. 8, 2007

(65) Prior Publication Data

US 2008/0129966 A1 Jun. 5, 2008

(30) Foreign Application Priority Data

Dec. 5, 2006 (JP) ............................. 2006-327763

(51) Int. Cl.
G03B 21/28 (2006.01)
F21V 7/00 (2006.01)
(52) U.S. Cl. ..................................... 353/98; 362/296.01
(58) Field of Classification Search ................. 353/98, 353/99; 362/268, 296.01, 297, 302
See application file for complete search history.

(56) References Cited

U.S. PATENT DOCUMENTS 5,911,489 A * 6/1999 Watanabe ..................... 353/98

2003/0198050 A1* 10/2003 Yamazaki et al. ............ 362/268
2004/0032739 A1* 2/2004 Johanson ..................... 362/304

FOREIGN PATENT DOCUMENTS

| JP | 2002-303818 A | 10/2002 |
| JP | 2004-206957 A | 7/2004 |
| JP | 2006-106527 A | 4/2006 |

OTHER PUBLICATIONS

Japanese Office Action dated Nov. 20, 2008, and English translation thereof issued in counterpart Japanese Application No. 2006-327763.
Chinese Office Action dated Dec. 26, 2008 (5 pages), and English translation thereof (5 pages) issued in counterpart Chinese Application No. 2007101964644.

* cited by examiner

Primary Examiner—Thanh X Luu
(74) Attorney, Agent, or Firm—Holtz, Holtz, Goodman & Chick, PC

(57) ABSTRACT

There is provided a light source device which emits a bundle of rays with less diffused light and which is suitable for a projector, the light source device including a reflector whose inner surface is made to constitute a reflection surface, a lamp made up of a spherical light emitting portion and a sealing portion which is formed in such a manner as to pass through a center of the light emitting portion to project from the light emitting portion, and a conical mirror whose outer surface is made to constitute a reflection surface, which is formed into a cone shape and which covers a front sealing portion of the sealing portion of the lamp, wherein the light emitting portion of the lamp is disposed in a position where a focal point of the reflector resides.

17 Claims, 10 Drawing Sheets

LIGHT SOURCE DEVICE, LIGHT SOURCE UNIT AND PROJECTOR PROVIDED WITH A CONICAL REFLECTING MIRROR TO INCREASE UTILIZATION EFFICIENCY OF EMITTED LIGHT

CROSS-REFERENCE TO RELATED APPLICATION

This application is based upon and claims the benefit of priority from the prior Japanese Patent Application No. 2006-327763, filed on Dec. 5, 2006, the entire contents of which are incorporated herein by reference.

BACKGROUND OF THE INVENTION

1. Field of the Invention

The present invention relates to a light source device, a light source unit including the light source device, and a projector including the light source unit and adapted to project an image based on a video signal.

2. Description of the Related Art

Currently, data projectors are used in many cases which function as image projection units for projecting a screen of a personal computer, a video image, and furthermore, an image based on image data stored in a memory card on to a screen. In recent years, the miniaturization of projectors have been in progress and in association with this trend, progress in miniaturization of light source devices has also been made so that light source devices can be accommodated in interiors of housings of those miniaturized projectors. Consequently, in order to provide a projection image of high luminance using such a miniaturized light source device, it is necessary to make efficient use of emerging light from the miniaturized light source device or reduce wasteful diffused light in light emitted from the light source device. For example, the Japanese Unexamined Patent Publication No. 2002-303818 proposes a light source device in which a conical mirror is disposed on a circumferential edge of a light source in which an inner surface which becomes progressively wider towards a light emitting end is made to constitute a reflection surface. According to the proposal of this patent document, since light emitted from the light source is reflected on the reflection surface of the conical mirror to thereby be made substantially parallel to the optical axis, the utilization efficiency of light incident on an optical system positioned to the rear of the light source device is increased.

As has been described above, the miniaturization of light source devices has been in progress in parallel with the recent trend of miniaturization of projectors. Consequently, in order to enable the projection of images of high luminance, it is necessary to increase the utilization of light emitted from the light source unit.

SUMMARY OF THE INVENTION

The present invention has been made in view of these situations and an objective thereof is to provide a light source device which emits a bundle of rays with less diffused light, a light source unit which includes the light source device, and a projector which includes the light source unit.

According to a preferred aspect of the invention, there is provided a light source device including a reflector whose inner surface is made to constitute a reflection surface, a lamp made up of a spherical light emitting portion and a sealing portion which is formed in such a manner as to pass through a center of the light emitting portion to project from the light emitting portion, and a cone-shaped conical mirror which covers a front sealing portion of the sealing portion of the lamp and whose outer surface is made to constitute a reflection surface, wherein the light emitting portion of the lamp is disposed in a position where a focal point of the reflector resides.

Furthermore, according to another preferred aspect of the invention, there is provided a light source unit having a light source device which includes a reflector whose inner surface is made to constitute a reflection surface, a lamp made up of a spherical light emitting portion and a sealing portion which is formed in such a manner as to pass through a center of the light emitting portion to project from the light emitting portion, and a cone-shaped conical mirror which covers a front sealing portion of the sealing portion of the lamp and whose outer surface is made to constitute a reflection surface, wherein the light emitting portion of the lamp is disposed in a position where a focal point of the reflector resides and a light guiding device which is disposed on an optical axis of the light source device for making uniform the intensity of a bundle of rays emitted from the light source device.

Furthermore, according to a further preferred aspect of the invention, there is provided a projector having a light source unit having a light source device and a light guiding device, a color wheel and a light source side optical system, a display device, a projection side optical system and a projector control means, wherein the light source device includes a reflector whose inner surface is made to constitute a reflection surface, a lamp made up of a spherical light emitting portion and a sealing portion which is formed in such a manner as to pass through a center of the light emitting portion to project from the light emitting portion, and a cone-shaped conical mirror which covers a front sealing portion of the sealing portion of the lamp and whose outer surface is made to constitute a reflection surface, the light emitting portion of the lamp being disposed in a position where a focal point of the reflector resides.

DESCRIPTION OF THE PREFERRED EMBODIMENT

Figure 1:
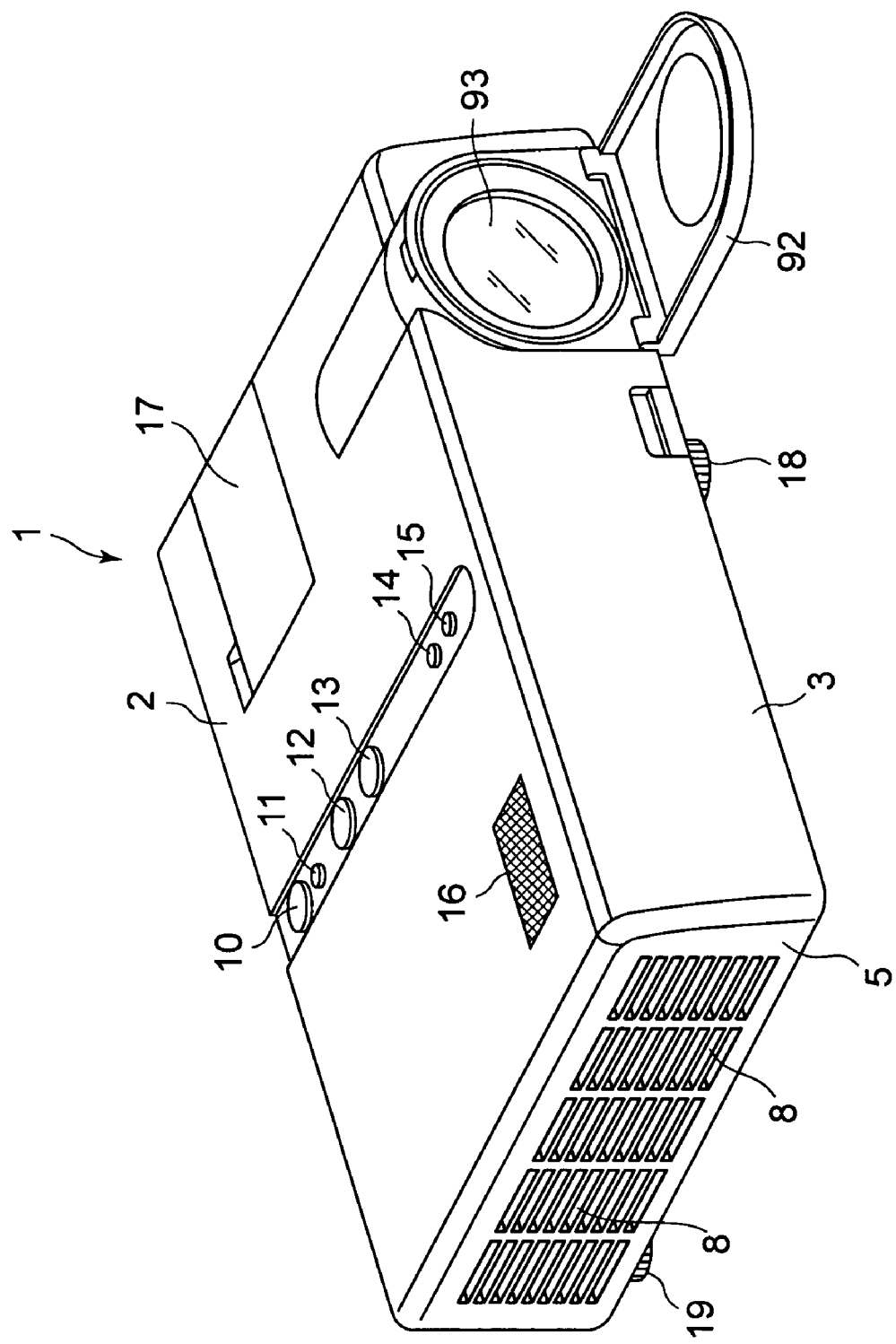
FIG. 1 is a perspective view of a projector according to an embodiment of the invention.

A projector 1, which is a best mode for carrying out the invention, has a light source unit 80 made up of a light source device 61 and a light guiding device 81, a color wheel 85 and a plurality of lens elements which constitute a light source side optical system 70, a display device 51, a projection side optical system 90 and a projector control means 101.

Then, the light source device 61 includes a reflector 63 which is a body of revolution that is formed about an optical axis X as a center axis and whose inner surface is made to constitute a reflection surface, a discharge lamp 62 made up of a spherical light emitting portion 71 and a sealing portion which is formed in such a manner as to protrude on the optical axis X which passes through the center of the light emitting portion 71 in symmetrical positions on an outer surface of the light emitting portion 71, the sealing portion being made up of a first sealing portion 72 positioned to the front and a second sealing portion 73 positioned to the rear of the light emitting portion 71, and a hollow cone-shaped conical mirror 64 whose outer surface is made to constitute a reflection surface and which is adapted to cover the first sealing portion 72.

In addition, lead wires 74 are provided to extend from a distal end of the first sealing portion 72 and a distal end of the second sealing portion 73 of the discharge lamp 62, respectively, and a through hole 75 is formed in a predetermined position on a side of the conical mirror 64 through which the lead wire 74 is passed.

Furthermore, an inner surface of the conical mirror 64 and a distal end portion of the first sealing portion 72 are fixed to each other by means of an adhesive which is made resistant to high temperatures.

Hereinafter, an embodiment of the invention will be described based on the accompanying drawings. A projector 1 according to the invention incorporates therein a control circuit which functions as a projector control means and has, as is shown in FIG. 1, a projection opening 93 provided with a lens cover 92 in a front plate 3 of a casing which is formed substantially into a parallelepiped.

In addition, the projector 1 has on an upper plate 2 of the casing thereof keys and indicators which include a key for a power supply switch 10, a manual image quality adjusting key 12, an automatic image quality adjusting key 13, a power supply lamp indicator 11, a light source lamp indicator 14, and an overheat indicator 15, a speaker hole 16 inside of which a speaker is installed, and an opening and closing lid 17 which covers sub-keys. The projector 1 also has on a back plate, not shown, of the casing various signal input terminals such as USB terminals connected to a power supply connector and a personal computer, a picture signal inputting video terminal and a mini-disc sub-terminal.

Additionally, the projector 1 has sub-keys for fine adjustment of image and image quality and setting various types of operations which are provided inside the opening and closing lid 17 provided on the upper plate, and intake vents are provided in a left-hand side plate of the casing, while discharge vents 8 are provided in a right-hand side plate 5, and cooling fans are provided in an interior of the housing of the projector 1.

In addition, the projector 1 has a front leg member 18, whose protruding amount can be adjustable, at the front of a bottom plate and stationary rear leg members 19 on rear left and right positions on the bottom plate, so that an image can be projected in such a manner as to match the height of a screen by adjusting the protruding amount of the front leg member 18.

Figure 2:
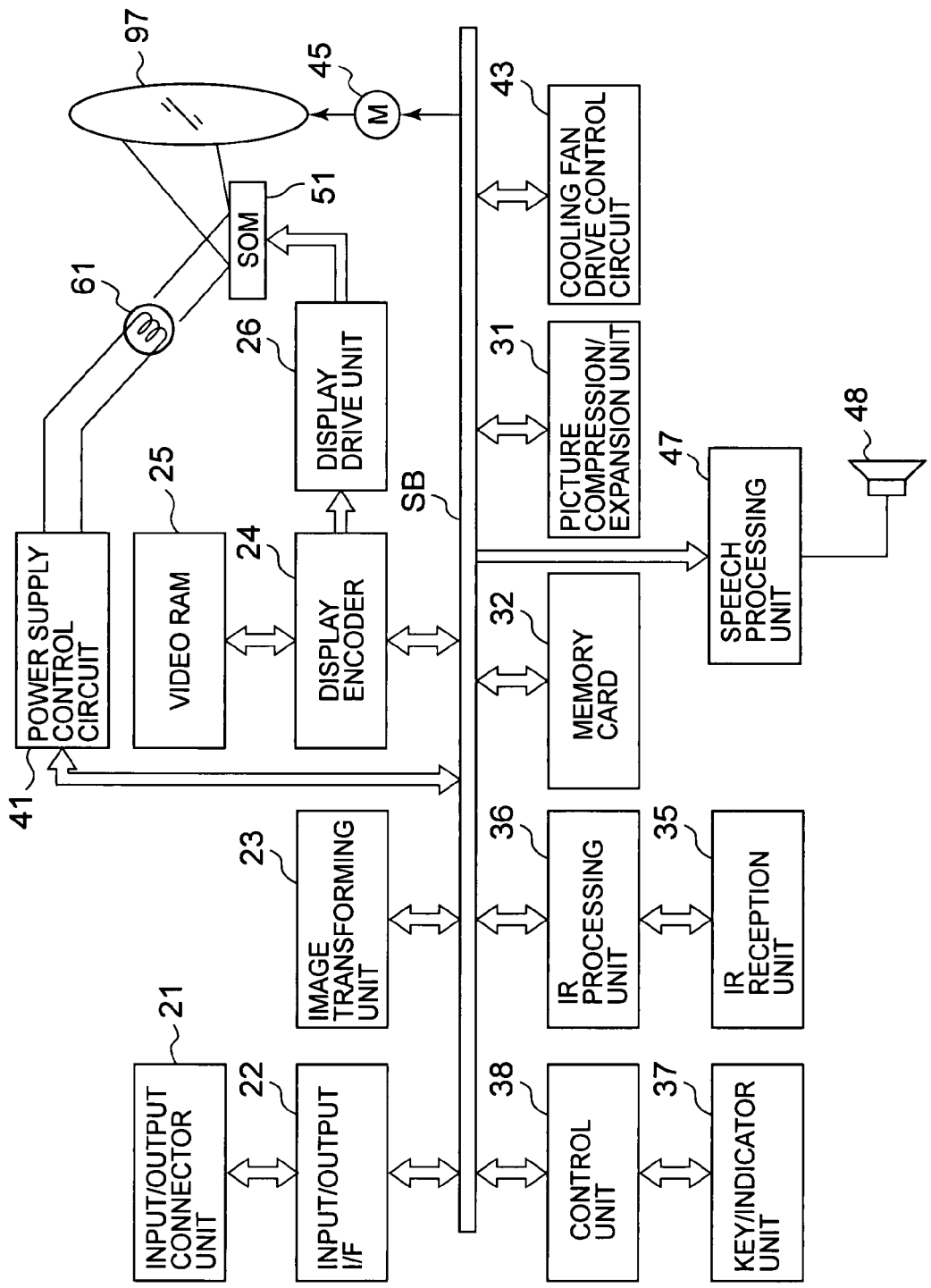
FIG. 2 is a control block diagram of the projector according to the embodiment of the invention.

Additionally, the control circuit, which is the projector control means of the projector 1, has a control unit 38, an input/output interface 22, an image transforming unit 23, a display encoder 24, and a display drive unit 26 as is shown in FIG. 2, whereby picture signals of various standards are inputted from an input/output connector 21 and are then sent to the image transforming unit 23 via the input/output interface 22 and a system bus (SB) where the picture signals are converted to be unified into picture signals of a predetermined format suitable for display, and thereafter, these picture signals so converted and unified are sent to the display encoder 24.

Then, the display encoder 24 deploys the picture signals sent thereto to a video RAM 25 for storage therein and generates a video signal from the contents of what is stored in the video RAM 25 and sends the video signal so generated to the display drive unit 26.

The display drive unit 26, into which video signals are inputted from the display encoder 24, drives the display device 51, which is a spatial optical modulator (SOM), at an appropriate frame rate in response to a video signal sent thereto, and when light from the light source unit 61 is incident thereon via various types of optical systems, the display device 51 then forms an optical image by reflection light thereof, and the image so formed is then projected for display on a screen, not shown, via a group of lens elements of a projection system which constitutes the projection side optical system. A movable lens group 97 of this projection side lens group is driven by a lens motor 45 for zooming adjustment and focusing adjustment.

A picture compression and expansion unit 31 performs a recording operation in which luminance signals and color-difference signals of picture signals are processed by the ADTC and Huffman coding method to compress data so as to be sequentially written on a memory card 32 which is a recording medium being freely mounted/dismounted, and in a reproducing mode reads out picture data recorded on the memory card 32, expands frame by frame individual picture data which constitute a series of time-varying images, and sends the picture data so expanded to the display encoder 24 via the image transforming unit 23 to enable the display of time-varying images based on the image data stored on the memory card 32.

The control unit 38 is such as to govern the control of operations of respective circuits within the projector 1 and is made up of a CPU, a ROM which stores operation programs for various settings in a stationary fashion and a RAM which is used as a work memory.

Operation signals from a key/indicator unit 37 which is made up of the main keys and indicators provided on the upper plate 2 of the casing of a main body of the projector 1 are sent out directly to the control unit 38, while key operation signals from a remote controller are received by an IR (infrared) reception unit 35, and code signals which are demodulated in an IR processing unit 36 are then sent to the control unit 38.

In addition, a speech processing unit 47 is connected to the control unit 38 via the system bus (SB), and the speech processing unit 47 includes a sound source circuit such as a PCM sound source, whereby in a projection mode and the reproduction mode, speech data is transformed into analog signals, and the speaker 48 is driven to emit loud sound therefrom.

The control unit 38 also controls a power supply control circuit 41 in such a manner that when a lamp switch key is operated, the discharge lamp of the light source device is illuminated by the power supply control circuit 41. Furthermore, the control unit 38 controls a cooling fan drive control circuit 43 in such a manner that a plurality of temperature sensors which are provided on the light source device are caused to detect temperatures so as to control the rotational speed of the cooling fans. In addition, even after the lamp of the light source device is turned off, the cooling fans are controlled to continue to rotate by a timer, and furthermore, depending upon the results of detection of temperatures by the temperature sensors, the cooling fan drive control circuit 43 performs a control to switch off the power supply of the projector main body by interrupting the light source device.

Figure 3:
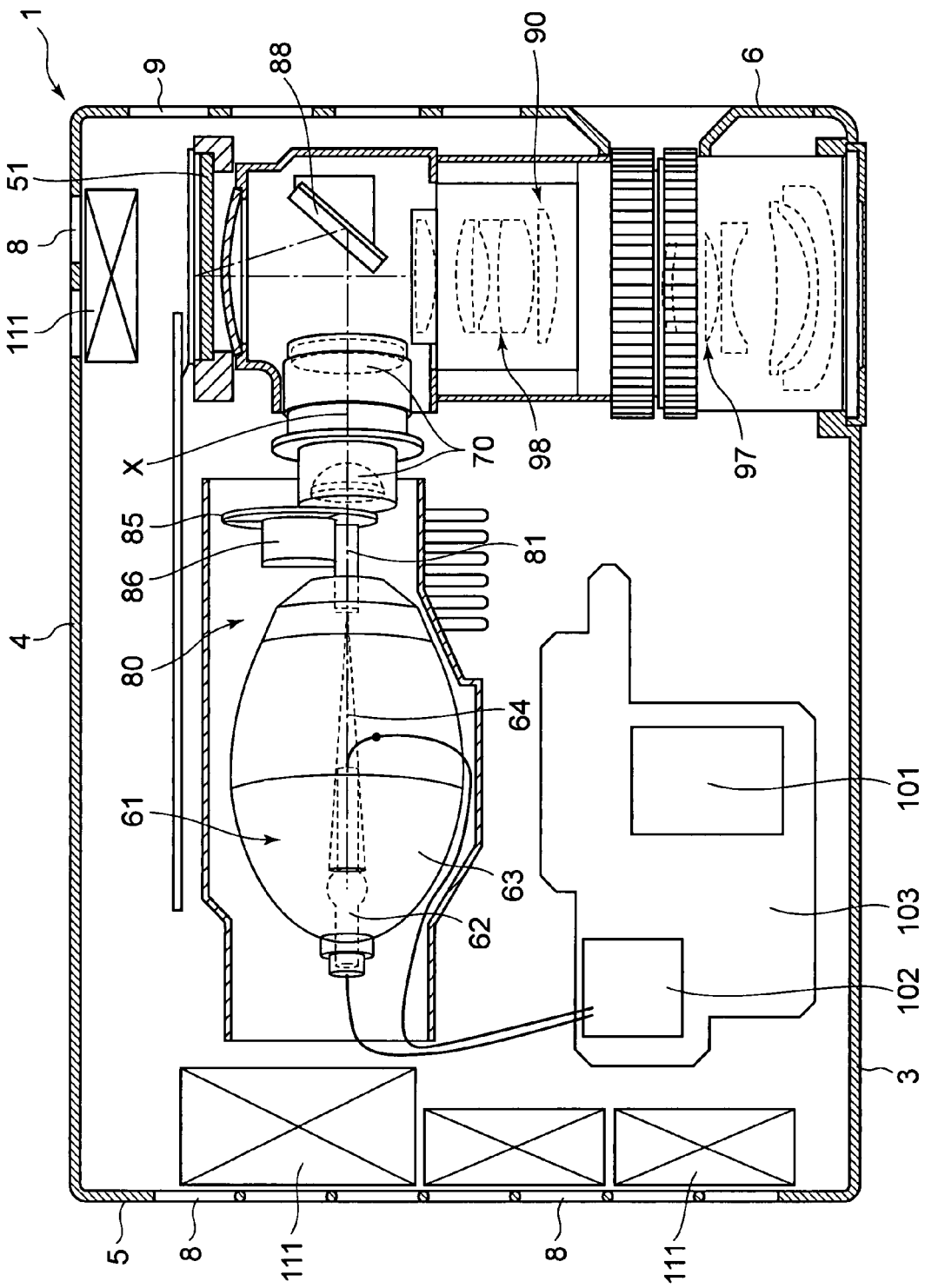
FIG. 3 is a plan view of the projector according to the embodiment of the invention with an upper plate removed.

In addition, as is shown in FIG. 3, a circuit board 103 including a projector control means 101 and a lamp power supply circuit 102 is disposed in the vicinity of the front plate 3 in the interior of the projector 1. The cooling fans 111 are disposed in the vicinity of the discharge vents 8 in the right-hand side plate 5 and the back plate 4. Furthermore, a plurality of intake vents 9 are formed in a left-hand side plate 6, so that outside air can be taken into the interior of the projector 1.

Furthermore, the light source unit 80 including the light source device 61 and the light guiding device 81 is disposed such that the optical axis X is parallel to the front plate 3 and the back plate 4, and the color wheel 85, the lens group as the light source side optical system 70 made up of a plurality of lens elements including a condenser lens and a reflection mirror 88 for reflecting light towards the display device 51 are disposed on a light emitting side of the light source unit 80.

In addition, the display device 51 is disposed in a position which is illuminated by reflection light from the reflection mirror 88 in which a plurality of pixels are arranged in rows and columns into a matrix pattern so as to display images by controlling the reflection of light incident thereon. Furthermore, the projection side optical system 90 for projecting reflection light from the display device 51 on to a projection plane such as a screen is disposed in the vicinity of the left-hand side plate 6, the projection side optical system 90 being made up of a fixed lens group 98 and a movable lens group 97.

The display device 51 is a display device 51 which has no means like a color filter for coloring incident light, and in this embodiment, a micromirror display device, which is generally referred to as a DMD (Digital Micromirror Device), is used. The aspect ratio of this micromirror display device is generally 4:3.

This micromirror display device is such that light which has entered from an incident direction which is tilted to one direction relative to the forward direction is divided and reflected as an on-state ray directed in the forward direction and an off-state ray directed in an oblique direction by switching the tilting directions of the plurality of micromirrors, so as to display images. Light incident on the micromirrors which are tilted in one inclined direction is made into an on-state ray which is reflected towards the forward direction, while light incident on the micromirrors which are tilted in the other inclined direction is reflected in an oblique direction by those micromirrors to make the light so reflected into an off-state ray, whereby off-state rays so produced are then made to be absorbed by a light absorbing plate, so that an image is displayed by a bright display realized by the reflection in the forward direction and a dark display realized by the reflection in the oblique direction.

Figure 4:
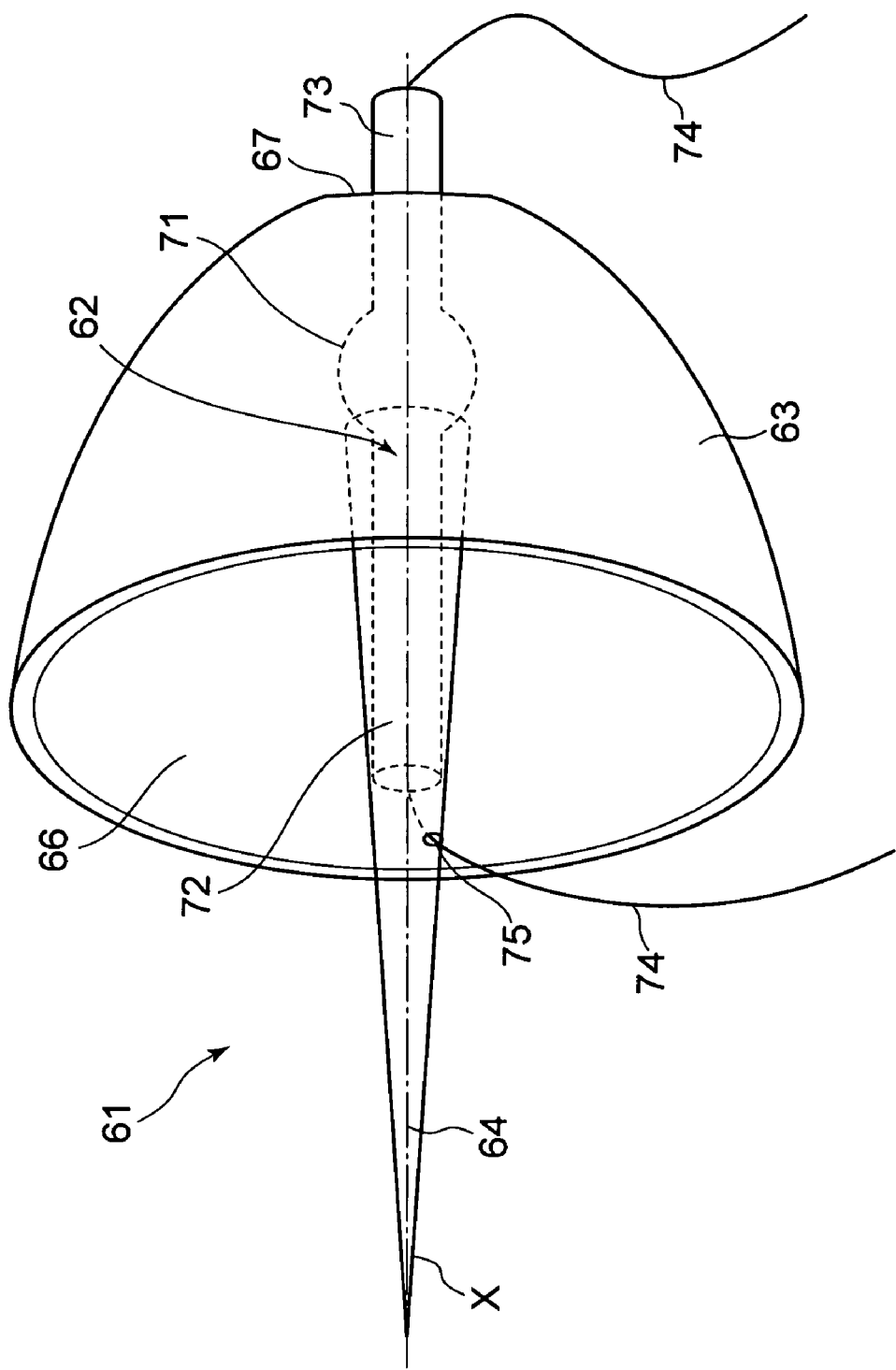
FIG. 4 is a perspective view of a light source device according to the embodiment of the invention.

As is shown in FIG. 4, the light source device 61 includes a reflector 63, a discharge lamp 62 and a conical mirror 64.

This reflector 63 is formed into the shape of an ellipsoid of revolution or a paraboloid of revolution that would be produced about the optical axis X as a center axis, and an inner surface thereof is specular finished to constitute a specular reflection surface. In addition, a front opening 66 from which light is emitted is formed at the front, while at the rear a rear opening 67 is formed through which the second sealing portion 73, which will be described later, is passed.

The discharge lamp 62 is made up of a spherical light emitting portion 71 and a sealing portion which is formed in such a manner as to protrude on an optical axis X which passes through the center of the light emitting portion 71 in symmetrical positions on an outer surface of the light emitting portion 71, and is disposed such that the center of the light emitting portion 71 is positioned at a focal point of the reflector 63. The sealing portion lying forward of the light emitting portion 71 is made to be a first sealing portion 72, while the sealing portion lying rearward of the light emitting portion 71 is made to be a second sealing portion 73, and lead wires 74 are pulled out from the distal end portions of the first sealing portion 72 and the second sealing portion 73 for supplying electricity to the discharge lamp 62.

The conical mirror 64 is made of metal or optical glass which is formed into a hollow circular cone shape whose outer surface is specular finished so as to constitute a reflection surface and is mounted on the first sealing portion 72 from a bottom portion side thereof. The conical mirror 64 is disposed in such a manner that a bottom end portion thereof is positioned in the vicinity of the light emitting portion 71 with its center axis made to coincide with the optical axis X of the reflector 63 and the center axis of the discharge lamp. In addition, a distal end portion of the conical mirror 64 is positioned close to the center of an incident surface of a light guiding device 81 in such a manner that the center axis of the light guiding device 81 and the center axis of the conical mirror coincide with each other. Furthermore, a distal end portion of the first sealing portion 72 and an inner surface of the conical mirror 64 are fixed to each other with an adhesive which is resistant to high temperatures. In addition, a through hole 75 is formed in a side of the conical mirror 64 through which the lead wire 74 connecting to the first sealing portion 72 is passed.

The light guiding device 81 which makes up the light source unit 80 shown in FIG. 3 is formed into a parallelepiped having a rectangular cross section, has an incident surface and an emerging surface, and is formed of optical glass. Furthermore, the light guiding device 81 is disposed such that its center axis coincides with the optical axis X of the light source device 61 and that the incident surface is close to the distal end portion of the conical mirror 64. This light guiding device 81 is designed to guide light incident from the incident surface while causing the light to be reflected on a reflection surface on an inner circumferential surface of the light guiding device 81 so as to be allowed to emerge from the emerging surface as light having a uniform intensity distribution.

In addition, the color wheel 85 is formed into a thin disc shape and has on its plane a color filter for sequentially coloring while light emerging from the light guiding device 81. The color wheel 85 is disposed on an emerging side of the light guiding device 81 in such a manner that the color filter is aligned on the optical axis X. In addition, the color wheel 85 is connected to a wheel motor 86 at its center for controlling the rotation thereof.

The lens group as the light source side optical system 70 collects a bundle of rays that has passed through the color wheel 85 and emits a bundle of rays from which diffused light constituting unnecessary light is removed to the reflection mirror 88. The reflection mirror 88 reflects light that has been emitted from the light source 61 and has passed through the light guiding device 81, the color wheel 85 and the light source side optical system 70 towards the display device 51, so as to project the light towards the display device 51 from a direction which is inclined to one direction relative to the forward direction of the display device 51.

In addition, the projection side optical system 90 includes a fixed lens barrel which incorporates the fixed lens group 98 and a movable lens barrel which is brought into engagement with the fixed lens barrel and which incorporates the movable lens group 97 which is made to reciprocate in an axial direction by rotating the movable lens barrel, and the projection side optical system 90 is made to make up a zoom lens by a combination of a plurality of lens elements which are built in these lens barrels.

In this way, the projector 1 is such that light is emitted in one direction from the light source device 61, the light which is incident from the light source device 61 on the incident surface of the light guiding device 81 and emerges from the emerging surface of the light guiding device 81 is made to have the uniform intensity distribution by the light guiding device 81 and is colored sequentially by rotationally driving the color wheel 85 of the light source unit 80 at high speeds, and the light given the uniform intensity distribution and so colored is projected towards the display device 51 by the light source side optical system 70 and the reflection mirror 88.

Then, when light from the light source device 61 gets stabilized after a predetermined period of time has elapsed from the state of turn on, single-color picture data of the respective colors is sequentially written on to the display device 51 in synchronism with projection cycles of the light of the respective colors which was colored when it passed through the color wheel 85, whereby single-color images of the respective colors are sequentially formed on the display device 51 by on-state rays which are reflected in the forward direction of the display device 51. Then, the projector 1 is such that the single-color picture light which emerge sequentially from the display device 51 are enlarged by the lens groups 97, 98 of the projection side optical system 90 for projection on to a projection surface, a full color image or picture in which the single-color images of the three colors are superposed on one another is projected on the projection surface.

Next, the advantage of the conical mirror 64 of the invention shown in FIG. 4 will be described. On principle, in the case of the reflector 63 being the ellipsoid of revolution, since light emitted from one focal point is converted to the other focal point, in the event that the incident side end portion of the light guiding device 81 is disposed where the other focal point lies, all the light can be made use of as effective light. However, since a luminescent spot of light emitted from the discharge lamp 62 is not a spot but is formed into a three-dimensional shape having a certain size in reality, light of the discharge lamp 62 is made to be shone in the vicinity of the other focal point of the reflector 63 with a three-dimensional variation.

Due to this, in the event that the light guiding device 81 is made smaller in size, it becomes difficult to allow the whole of reflection light from the reflector 63 to be incident on the light guiding device 81, and not only is the utilization efficiency of light emitted from the light source device 61 is decreased by light that is not allowed to be incident on the light guiding device 81 but also the light which is not allowed to be incident on the light guiding device 81 becomes stray light, whereby there may be a case where a projected image is badly affected.

Figure 5:
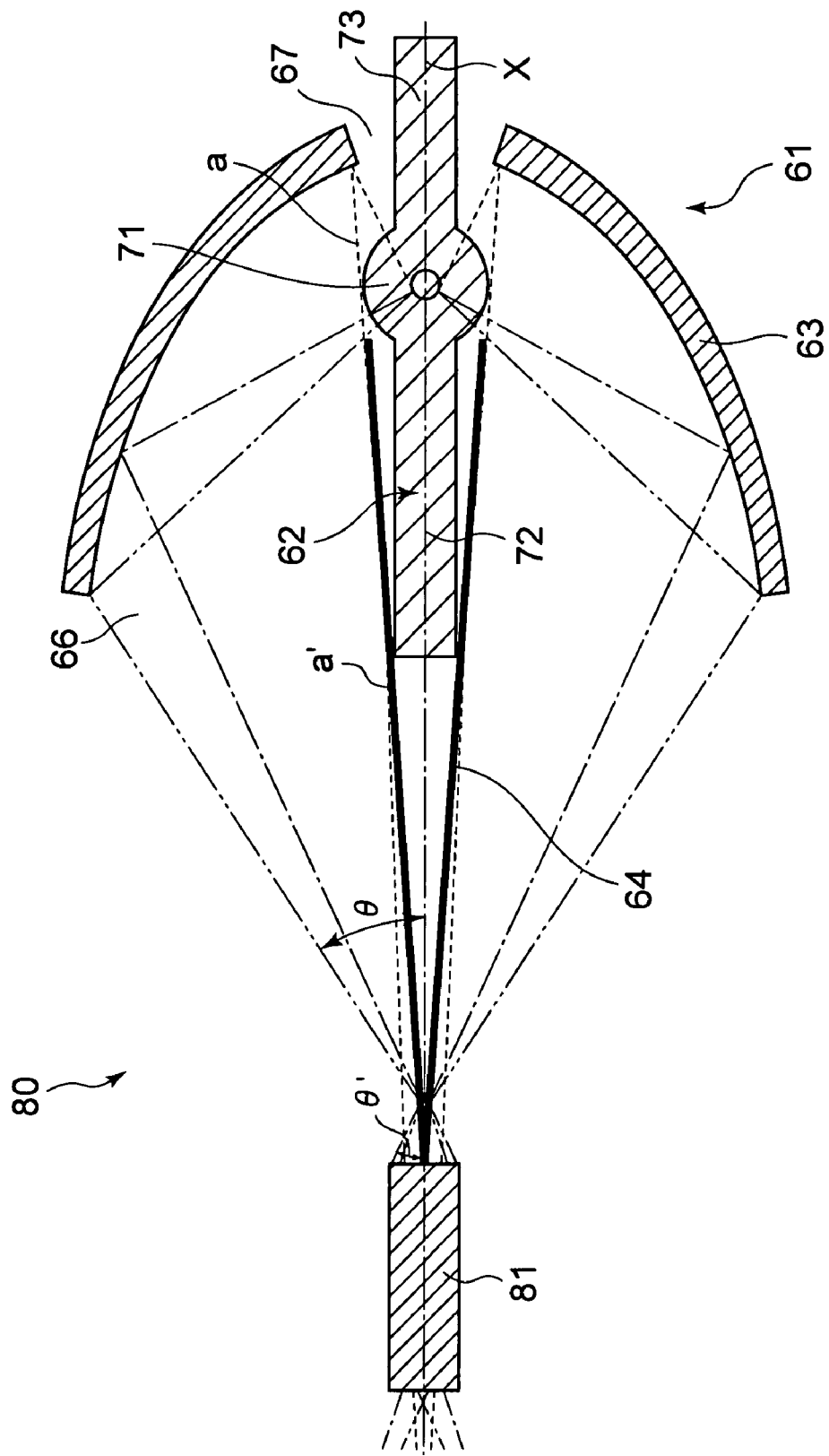
FIG. 5 is a diagram showing a section of a light source unit according to the embodiment of the invention and also showing exemplarily an optical path thereof.

By providing the conical mirror 64, however, as is shown in FIG. 5, letting an angle formed by a ray emitted from the reflector 63 and the optical axis X be θ and an angle formed by a ray reflected on the conical mirror 64 and the optical axis X be θ', a ray emitted from the light emitting portion 71 of the discharge lamp 62 is reflected on the reflection surface of the reflector 63 and is then shone to the reflection surface of the conical mirror 64 at the angle θ which is made between the optical axis X and itself and is further reflected on the reflection surface of the conical mirror 64 so as to be incident on the light guiding device 81 at the angle θ' formed between the optical axis X and itself which is smaller than the angle θ. Consequently, light that is conventionally not allowed to be incident on the light guiding device 81 or that conventionally becomes stray light even in case it is allowed to be incident on the light guiding device 81 due to the angle formed between the optical axis X and itself being large becomes effective light, thereby making it possible to increase the utilization efficiency of light emitted from the light source device 61.

Furthermore, like a ray a shown in FIG. 5, light that is supposed to be incident on the light guiding device 81 but is shone to the outside of the incident surface of the light guiding device 81 as a result of reflection on the first sealing portion 72 due to the first sealing portion 72 lying between a reflection point on the reflection surface of the reflector 63 to the focal point of the reflector 63 is also reflected on the conical mirror 64 to constitute a ray a' which is allowed to be incident on the light guiding device 81.

Figure 6:
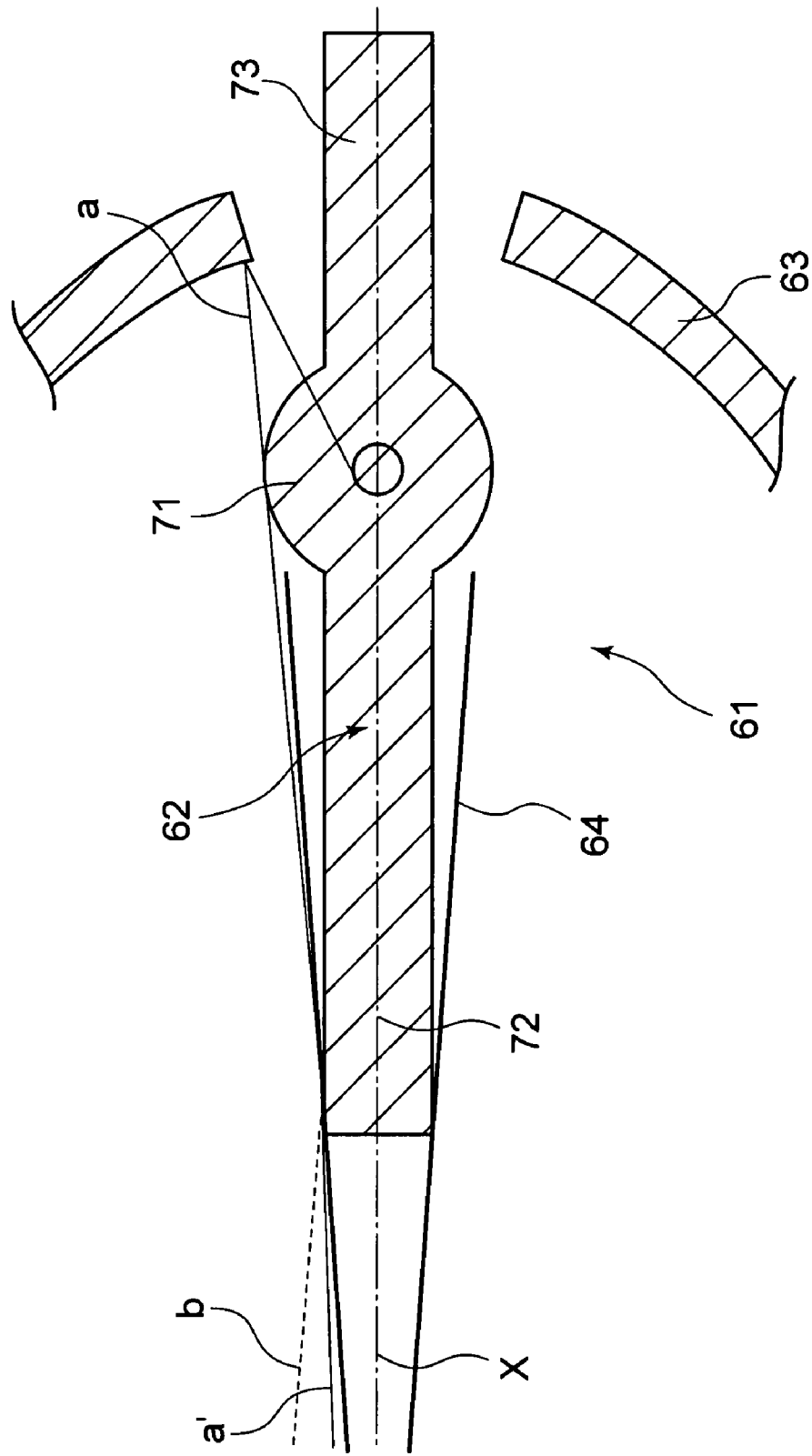
FIG. 6 is an exemplary diagram which explains emerging light in the light source device according to the embodiment of the invention.

Namely, as is shown in FIG. 6, in the event that no conical mirror 64 is provided, the ray a is shone on to the first sealing portion 72 to be reflected thereon and then becomes a ray b which is shone to the outside of the incident surface of the light guiding device 81. However, with the conical mirror 64 so disposed, the light that would otherwise be shone to the outside of the incident surface of the light guiding device 81 is reflected on the conical mirror 64 so as to constitute the effective ray a' which is incident on the light guiding device 81.

Figure 7:
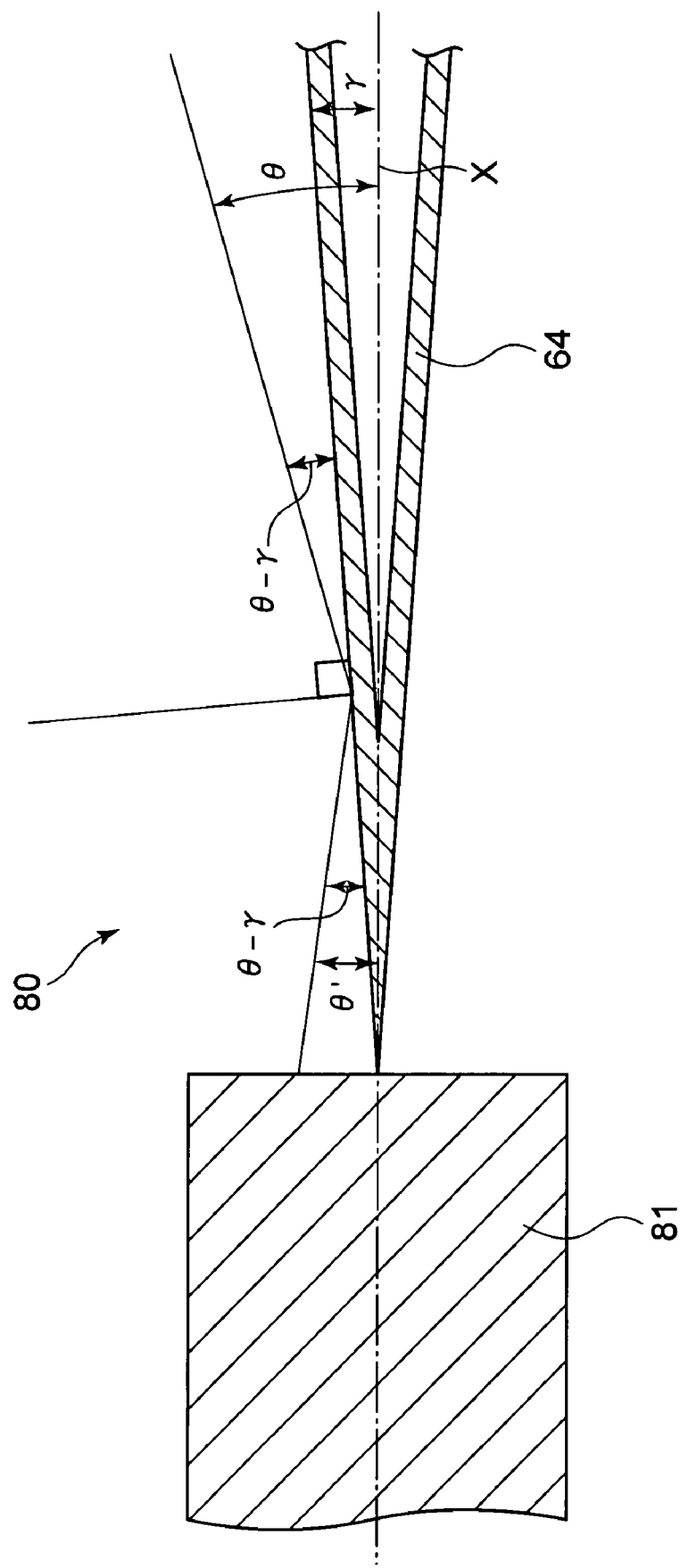
FIG. 7 is an exemplary diagram which explains a state of incident light on a light guiding device in the light source unit according to the embodiment of the invention.

In addition, as is shown in FIG. 7, letting an angle formed by the side of the conical mirror 64 and the optical axis X be γ, a ray emitted from the reflector 63 at an angle θ which is made with the optical axis X is shone to the reflection surface of the conical mirror 64 at an angle θ−γ and is reflected at the angle θ−γ relative to the reflection surface of the conical mirror 64. Due to this, due to the reflection surface of the conical mirror 64 having the angle γ made between the optical axis X and itself, light reflected on the conical mirror 64 forms an angle θ−2γ relative to the optical axis X. Namely, θ'=θ−2γ, the angle made by the light reflected on the conical mirror 64 and the optical axis X is made smaller by an angle equal to 2γ which is twice the angle γ which is made by the conical mirror 64 and the optical axis X, whereby the incidence of light on the light guiding device 81 is enabled easily.

Figure 8:
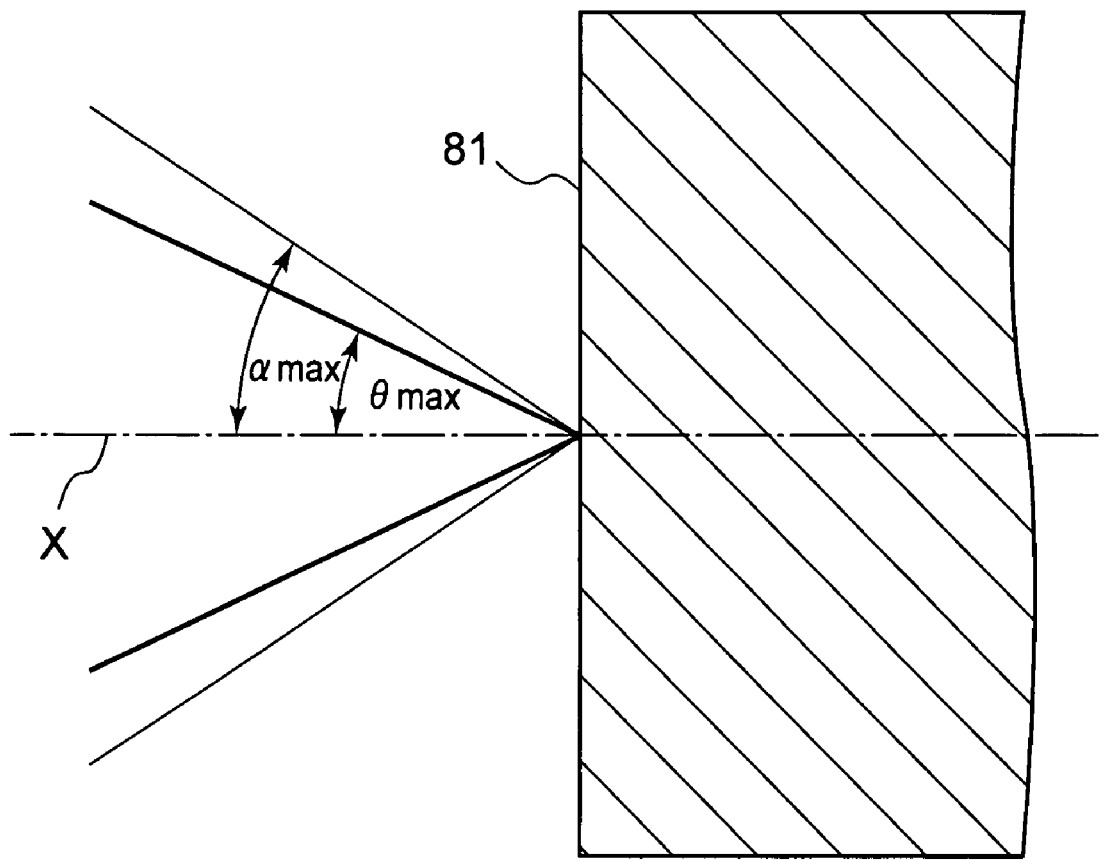
FIG. 8 is an exemplary diagram showing a state of emerging light from the light guiding device according to the embodiment of the invention.

Furthermore, a ray that is incident on the light guiding device 81 in such a state that it becomes substantially parallel to the optical axis X is emitted at an angle at which it is incident on the light guiding device 81 from the incident surface due to the light guiding device 81 being formed into the parallelepiped shape, and as is shown in FIG. 8, letting a maximum angle made a ray emerging from an emerging surface of a light guiding device 81 of a conventional projector 1 and the optical axis X be αmax and a maximum angle made by a ray emerging from the emerging surface of the light guiding device 81 of the embodiment and the optical axis X be θmax, θmax<αmax, in the optical system lying rearwards of the conical mirror 64, light which constitutes stray light or diffused light is decreased, thereby making it possible to increase the light utilization efficiency. Consequently, the quantity of light which is allowed to be incident on the light guiding device 81 can be increased by the provision of the conical mirror 64 and the light utilization efficiency in the optical system lying rearwards of the conical mirror 64 so disposed is also increased.

According to the invention, by disposing the conical mirror 64 on the light source device 61, light that used to be reflected on the first sealing portion 72 of the discharge lamp 62 to constitute stray light can be made to be incident on the light guiding device 81 as effective light.

In addition, since the side of the conical mirror 64 is inclined relative to the optical axis X, the angle made by light incident on the light guiding device 81 and the optical axis X is decreased, whereby the utilization efficiency of light emitted from the light source device 61 is enhanced. Consequently, while using the light source device 61 whose miniaturization has been in progress in these years, a projected image with higher luminance can be provided.

Furthermore, since the bundle of rays emitted from the reflector 63 which is formed into the body of revolution is converted to a circular shape, by forming the conical mirror 64 into the circular cone shape, the bundle of rays can be shone towards the incident surface of the light guiding device 81 without collapsing the shape of the bundle of rays which is emitted from the reflector 63 in such a manner as to converge to the circular shape. Consequently, the bundle of rays emitted from the light source device 61 can be made to be effective light to a maximum extent so as to be incident on the light guiding device 81, the utilization efficiency of light emitted from the light source device 61 being enhanced.

In addition, by disposing the distal end portion of the conical mirror 64 in such a manner as to be close to the center of the incident surface of the light guiding device 81, most of light of a bundle of rays emitted from the reflector 63 which constitutes effective light is allowed to be shone on to the conical mirror 64, and the angle made by most of rays of the bundle of rays incident on the light guiding device 81 and the optical axis X approaches parallelism. Consequently, the utilization efficiency of light emitted from the light source device 61 is increased.

Figure 9:
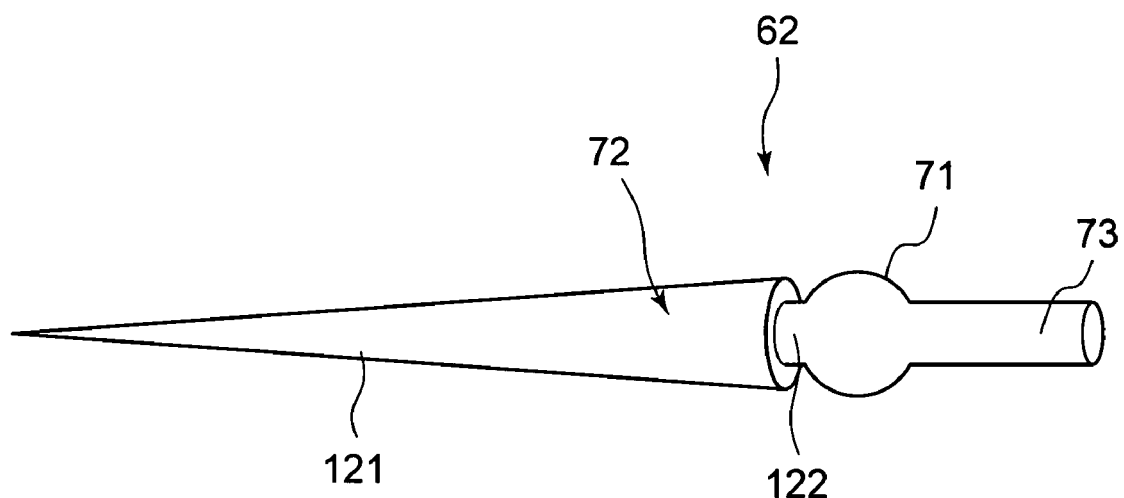
FIG. 9 is a perspective view of a discharge lamp according to a modified example of the invention.

Next, modified examples of the embodiment will be described. While in the embodiment that has been described heretofore, the conical mirror 64 is disposed so as to be placed over the first sealing portion 72, as is shown in FIG. 9, a conical mirror 64 and a first sealing portion 72 can be molded into a single piece so that the first sealing portion 72 is made up of a conical mirror portion 121 and a connecting portion 122.

By forming the conical mirror 64 and the first sealing portion 72 into the single piece, the dislocation of the conical mirror 64 from the first sealing portion 72 can be prevented. In addition, as with the embodiment described above, not only light which is reflected on the first sealing portion 72 of the discharge lamp 62 to thereby constitute unnecessary light can be made to be incident on the light guiding device 81 but also the angle made by light incident on the light guiding device 81 and the optical axis X can be reduced, thereby making it possible to increase the utilization efficiency of light emitted from the light source device 61.

Figure 10:
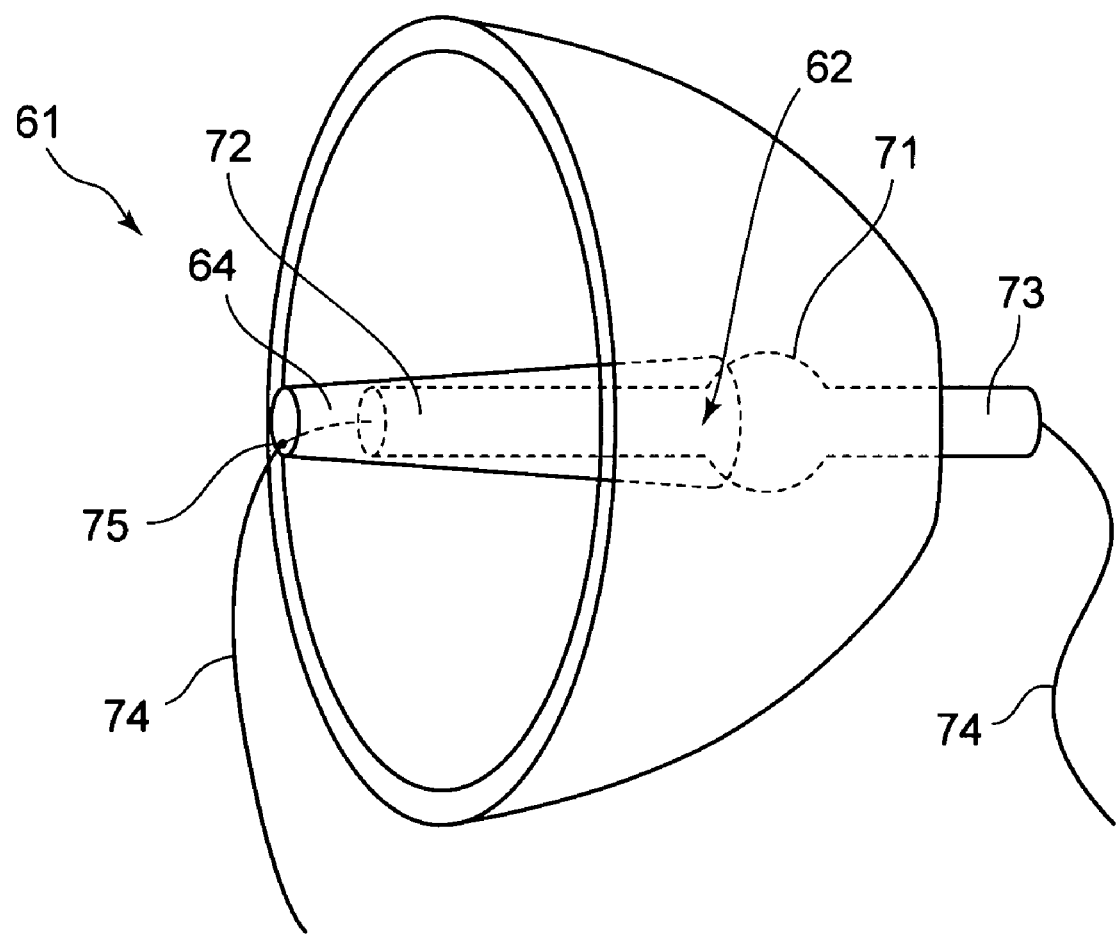
FIG. 10 is a perspective view of a light source device according to another modified example of the invention.

In addition, as is shown in FIG. 10, a conical mirror 64 can be used which is formed into a frustum of cone. By forming the conical mirror 64 into the frustum of cone in this way, as with the embodiment that has been described above, light which is reflected on the first sealing portion 72 of the discharge lamp 62 to thereby constitute unnecessary light can be made to be incident on the light guiding device 81 as effective light, and a space can be formed between the light source device 61 and the light guiding device 81. In addition, by forming the space between the light source device 61 and the light guiding device 81, the color wheel 85 can be disposed between the light source device 61 and the light guiding device 81 or an explosion-proof filter can be formed in front of the light source device 61, thereby making it possible to enhance the degree of freedom in design modification.

Furthermore, the shape of the conical mirror 64 is not limited to the conical shape as shown in the drawings but there may be a case where the conical mirror 64 is formed into a polygonal pyramid including a quadrangular pyramid, a hexagonal pyramid and an octagonal pyramid, as well as a polygonal frustum of pyramid.

Note that the invention is not limited to the embodiments that have been described heretofore but can be modified and/or improved freely without departing from the spirit and scope of the invention.

What is claimed is:

1. A light source device comprising:
   a lamp having a spherical light emitting portion and a sealing portion which is formed in such a manner as to pass through a center of the light emitting portion and to project from the light emitting portion;
   a reflector whose inner surface forms a reflection surface, wherein the reflector reflects and converges light which is emitted from the light emitting portion; and
   a conical mirror whose outer surface forms a reflection surface, and which is formed into a cone shape and which covers a front sealing portion of the sealing portion of the lamp,
   wherein the conical mirror is disposed at a position such that the conical mirror reflects a ray of the light which is emitted from the light emitting portion and reflected by the reflector, and which then goes toward the front sealing portion.

2. The light source device as set forth in claim 1, wherein the conical mirror and the front sealing portion of the lamp are molded integrally into a single piece.

3. The light source device as set forth in claim 2, wherein the conical mirror is formed into a circular cone shape.

4. The light source device as set forth in claim 2, wherein the conical mirror is cut at a position lying further forwards than the front sealing portion so as to be formed into a frustum of cone shape.

5. The light source device as set forth in claim 1, wherein the conical mirror is formed into a circular cone shape.

6. The light source device as set forth in claim 1, wherein the conical mirror is cut at a position lying further forwards than the front sealing portion so as to be formed into a frustum of cone shape.

7. The light source device as set forth in claim 1, wherein the inner surface of the reflector is formed into a shape of an ellipsoid of revolution.

8. The light source device as set forth in claim 7, wherein the light emitting portion of the lamp is disposed at a position of a focal point of the reflector.

9. The light source device as set forth in claim 1, wherein:
   a ray of the light which is emitted from the light emitting portion is reflected by the reflector and the reflected ray is then incident on the conical mirror at an angle of $\theta$ formed between the reflected ray emitted from the reflector and an optical axis of the light source device,
   the ray which is incident on the conical mirror is reflected by the conical mirror at an angle of $\theta'$ formed between the reflected ray emitted from the conical mirror and the optical axis of the light source device, and
   the angle $\theta'$ is smaller than the angle $\theta$.

10. The light source device as set forth in claim 1, wherein:
a ray of the light which is emitted from the light emitting portion is reflected by a rear end portion of the reflector that is provided at a side of a rear opening of the reflector through which a rear sealing portion of the sealing portion is passed and the reflected ray is incident on the conical mirror at an angle of θ formed between the reflected ray emitted from the reflector and an optical axis of the light source device, the ray which is incident on the conical mirror is reflected by the conical mirror at an angle of θ' formed between the reflected ray emitted from the conical mirror and the optical axis of the light source device, and the angle θ' is smaller than the angle θ.

11. A light source unit comprising:
a light source device which comprises:
  (i) a lamp having a spherical light emitting portion and a sealing portion which is formed in such a manner as to pass through a center of the light emitting portion and to project from the light emitting portion,
  (ii) a reflector whose inner surface forms a reflection surface, wherein the reflector reflects and converges light which is emitted from the light emitting portion, and
  (iii) a conical mirror whose outer surface forms a reflection surface, and which is formed into a cone shape and which covers a front sealing portion of the sealing portion of the lamp,
  wherein the conical mirror is disposed at a position such that the conical mirror reflects a ray of the light which is emitted from the light emitting portion and reflected by the reflector, and which then goes toward the front sealing portion; and
a light guiding device which is disposed on an optical axis of the light source device and which makes uniform an intensity of a bundle of rays emitted from the light source device.

12. The light source unit as set forth in claim 11, wherein the conical mirror is formed into a circular cone shape, and a distal end portion thereof is disposed close to a center of an incident surface of the light guiding device.

13. The light source unit as set forth in claim 11, wherein the inner surface of the reflector is formed into a shape of an ellipsoid of revolution.

14. The light source unit as set forth in claim 13, wherein the light emitting portion of the lamp is disposed at a position of a focal point of the reflector.

15. A projector comprising:
a light source unit comprising a light source device and a light guiding device;
a color wheel and a light source side optical system;
a display device;
a projection side optical system; and
projector control means,
wherein the light source device comprises:
  a lamp having a spherical light emitting portion and a sealing portion which is formed in such a manner as to pass through a center of the light emitting portion and to project from the light emitting portion,
  a reflector whose inner surface forms a reflection surface, wherein the reflector reflects and converges light which is emitted from the light emitting portion, and
  a conical mirror whose outer surface forms a reflection surface, and which is formed into a cone shape and which covers a front sealing portion of the sealing portion of the lamp,
  wherein the conical mirror is disposed at a position such that the conical mirror reflects a ray of the light which is emitted from the light emitting portion and reflected by the reflector, and which then goes toward the front sealing portion.

16. The projector as set forth in claim 15, wherein the inner surface of the reflector is formed into a shape of an ellipsoid of revolution.

17. The projector as set forth in claim 16, wherein the light emitting portion of the lamp is disposed at a position of a focal point of the reflector.

* * * * *